US012417339B1

(12) United States Patent
Baack et al.

(10) Patent No.: US 12,417,339 B1
(45) Date of Patent: Sep. 16, 2025

(54) ANALYTICS TAG DATA QUALITY SCANNING

(71) Applicant: United Services Automobile Association (USAA), San Antonio, TX (US)

(72) Inventors: Amber Michelle Baack, Wylie, TX (US); Alexander Paul Motter, San Antonio, TX (US); Aaron May, New Braunfels, TX (US); Holt Britton Beach, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/227,555

(22) Filed: Jul. 28, 2023

Related U.S. Application Data

(60) Provisional application No. 63/393,596, filed on Jul. 29, 2022.

(51) Int. Cl.
*G06F 40/117* (2020.01)
*G06F 40/166* (2020.01)

(52) U.S. Cl.
CPC .......... *G06F 40/117* (2020.01); *G06F 40/166* (2020.01)

(58) Field of Classification Search
CPC .............................. G06F 40/117; G06F 40/166
See application file for complete search history.

(56) References Cited

U.S. PATENT DOCUMENTS

| | | | |
|---|---|---|---|
| 2014/0089782 A1* | 3/2014 | Cook | G06F 16/957 715/234 |
| 2014/0280012 A1* | 9/2014 | Feuerlein | G06F 16/986 707/709 |
| 2016/0048602 A1* | 2/2016 | Yastrebenetsky | H04L 67/02 715/234 |
| 2019/0065511 A1* | 2/2019 | Pestana | G06Q 30/0201 |
| 2021/0083954 A1* | 3/2021 | Kieviet | H04L 43/045 |
| 2021/0224704 A1* | 7/2021 | Waldo, IV | G06F 16/2365 |
| 2023/0069222 A1* | 3/2023 | Skazinski | G06F 8/51 |
| 2023/0342344 A1* | 10/2023 | Brown | G06F 16/2255 |

* cited by examiner

*Primary Examiner* — Irete F Ehichioya
*Assistant Examiner* — Jianmei F Duckworth
(74) *Attorney, Agent, or Firm* — Fletcher Yoder, PC (57) ABSTRACT

This disclosure is related to systems and methods for performing data quality scanning on analytics tags within electronic documents (e.g., web pages). Specifically, tag data quality rules are generated from tag design documents within an organization. A design file scanner script is used to automatically convert tag design documents with custom tagging elements into data quality rules in a dictionary data structure. Once generated, the tag data quality rules may be stored in a data rule repository and used at a later time for performing data quality checks on production tagging data. As such, the disclosed systems and methods may increase the quality of tag design documents and overall quality of custom tagging within the organization.

16 Claims, 11 Drawing Sheets

| ID | EXPERIENCE_NM | ANALYST_NM | V8_TXT | V9_TXT | C2_TXT | V5_TXT | V6_TXT | V7_TXT | L1_TXT | L2_TXT | CUSTOM_TXT |
|---|---|---|---|---|---|---|---|---|---|---|---|
| 22 | Checking Accoun... | John Doe | svc_bnk_chk_conversi... | trapdoor | Tracklink | svc | bnk | dmd | chk | chkn_a | {} |
| 23 | Checking Accoun... | John Doe | svc_bnk_chk_conversi... | confirmation_model_re... | Pageview | svc | bnk | dmd | chk | chkn_a | {} |
| 24 | Checking Accoun... | John Doe | svc_bnk_chk_conversi... | confirmation_model_se... | Pageview | svc | bnk | dmd | chk | chkn_a | {'event45'} |
| 25 | Cash Advance | John Doe | svc_bnk_chc_cash_adv | bk_credit_card_cash_... | Pageview | svc | bnk | crc | n_a | n_a!n_a | {'evar45': '45, 'evar52':'mm/yy'} |
| 26 | Cash Advance | John Doe | svc_bnk_chc_cash_adv | bk_credit_card_cash_... | Tracklink | svc | bnk | crc | n_a | n_a!n_a | {'evar51': 'ABC_vc, ABC_ae, ABC_m... |
| 27 | Cash Advance | John Doe | svc_bnk_chc_cash_adv | bk_credit_card_cash_... | Pageview | svc | bnk | crc | n_a | n_a!n_a | {'evar51': 'ABC_vc, ABC_ae, ABC_m... |
| 28 | Cash Advance | John Doe | svc_bnk_chc_cash_adv | bk_credit_card_cash_... | Pageview | svc | bnk | crc | n_a | n_a!n_a | {} |
| 29 | Block Unblock | John Doe | block_hub | bk_block_cards | Tracklink | svc | bnk | crc | n_a | n_a!n_a | {'evar53': 'all cards\credit cards\inde... |
| 30 | Block Unblock | John Doe | block_hub | bk_block_cards | Pageview | svc | bnk | crc | n_a | n_a!n_a | {'event185': 185, 'evar51': 'total_nbr... |

```
...row: row.C2 in ['pageview', 'tracklink'], axis=1)
...row: row.V5 in ['svc', 'acq', 'ent', 'inq', 'mmv', 'til', 'adv', 'ful', 'too'], axis=1)
...row: row.V6 in ['asc', 'gen', 'inv', 'pnc', 'adv', 'lif', 'bnk', 'ent', 'fpn', 'int', 'n_a'], axis=1
...row: row.V7 in ['ent', 'bnk', 'pnc', 'als', 'ann', 'app', 'aps', 'aut', 'brs', 'bus', 'car', 'cld', 'cmn', 'crc', ...
    ...row: row.L1 in ['n_a', 'ccd', 'chk', 'dbt', 'gcd', 'pcd', 'psc', 'sav', 'scd', 'sgn', 'slc', 'wcd', 'wcd'], axi...
        ...row: (row.L2[3:7] in [':n_a', ':4st', ':ae', ':bns', ':bsc', ':cor', ':eag', ':frs',':inx', ':mc', ':rck', ...
```

*FIG. 9*

| check_V5 | check_V6 | check_V7 | check_L1 | check_L2 | check_V8 | check_V9 | check_custom_names | check_same_page_levels | check_results |
|---|---|---|---|---|---|---|---|---|---|
| TRUE | TRUE | TRUE | TRUE | TRUE | TRUE | TRUE | TRUE | TRUE | TRUE |
| TRUE | TRUE | TRUE | TRUE | TRUE | TRUE | TRUE | TRUE | TRUE | TRUE |
| TRUE | TRUE | TRUE | TRUE | TRUE | TRUE | TRUE | FALSE | TRUE | FALSE |
| TRUE | TRUE | TRUE | TRUE | TRUE | TRUE | TRUE | TRUE | TRUE | TRUE |
| TRUE | TRUE | TRUE | TRUE | FALSE | TRUE | TRUE | TRUE | FALSE | FALSE |
| TRUE | TRUE | TRUE | TRUE | TRUE | TRUE | TRUE | TRUE | TRUE | TRUE |
| TRUE | TRUE | TRUE | TRUE | TRUE | TRUE | TRUE | TRUE | TRUE | TRUE |
| TRUE | TRUE | TRUE | TRUE | TRUE | TRUE | TRUE | TRUE | TRUE | TRUE |
| TRUE | TRUE | TRUE | TRUE | TRUE | TRUE | TRUE | TRUE | TRUE | TRUE |

ANALYTICS TAG DATA QUALITY SCANNING

CROSS-REFERENCE TO RELATED APPLICATION

The present application claims priority to and the benefit of U.S. Provisional Application No. 63/393,596, entitled "ANALYTICS TAG DATA QUALITY SCANNING" and filed on Jul. 29, 2022, the disclosure of which is incorporated by reference herein in its entirety for all purposes.

BACKGROUND

In the digital world, it is oftentimes desirable to perform analytics tracking of digital solutions to understand a user's journey through the digital solution. Such tracking may provide valuable insights, which may be used to impact future digital solutions, sustaining efforts across existing digital solutions, and more. Analytics tools, such as Adobe Analytics, facilitate such tracking by enabling solution owners to implement tagging in their digital solutions to track specific data as it is generated within a digital solution. Tags are code (e.g., JavaScript) that provide a mechanism to identify and capture particular analytics information generated at a page/portion of a digital solution (e.g., a digital experience). Tags may specify particular data to capture on particular pages.

As digital experiences and solutions become more and more prevalent, analytic/digital tagging may become more prevalent as well. Organizations may rely heavily on digital tagging to provide insight into not only crucial user reporting metrics (e.g., clickthrough rates of experiences, start/complete metrics, page-to-page reporting, etc.), but also additional modular values stored in custom tagging attributes. Many organizations have particular policies around how tags are used and/or customized. These policies provide particular rules around where the tags may reside, the type of information that they may collect, and particular expected formatting and/or customizations. Unfortunately, however, there are oftentimes no constraints that rigidly impose the policies, causing inconsistencies in tagging implementation, where many times, the tagging does not adhere to the prescribed policies. Indeed, in many instances the analysts developing the tagging documentation and the developers coding the tags are different people, which may lead to translation issues from design to implementation. Further, in some cases, tags may "break" as an unintended consequence of updating unrelated code or other updates to the system/experience.

In particular, customization comes a steep cost from a monitoring standpoint, as a single custom variable can contain a wide breadth of values such as strings, numbers, numeric ranges, datetime values, or any combination of values depending on the digital experience it fired on. This prevents consistent rules being applied that would make data validation significantly easier. Additionally, each custom tagging attribute may be preceded with a key that identifies the digital experience it was deployed in (i.e. esign_signature: y may indicate deployment within the eSign digital experience) that coerces every data type to string, making standard data validation veritably impossible. To add to the complexity, some custom metrics are designed with conditional firing requirements, for example only appearing when certain conditions are met (e.g., firing if only one debit card is present or a second time a user has accessed a certain page). This creates an ambiguous state, in which a user of the data has no way of knowing whether the custom element was missing due to intentional design or tagging error.

As user bases increase, the amount of server calls collected from Analytics Tools, such as Adobe Analytics and other tools may also increase, reaching daily averages in ranges not suitable for human data integrity verification (e.g., in the tens of millions from Adobe Analytics alone). As the number of digital experiences increase within an organization, the quantity of tags is untenable to be physically assessed with any sort of regular cadence. Indeed, even if they could be assessed regularly, earlier validations would become obsolete in the time required to complete a full scan. All these factors contribute to a convoluted and hard to monitor structure where organizations can inadvertently collect private identifying information (PII) or billions of defective or useless server calls.

Accordingly, new automated systems and techniques to enable regular assessment of digital experiences/solutions and their corresponding digital tagging to ensure the accuracy of this tagging are desired.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments provided herein leverage a production tag feed and tag design document to compare expected tagging against actual tagging results. Specifically, a design file scanner script is used to convert tag design documentation into data quality rules that are stored in a data rule repository. A dictionary data structure stores expected values of custom tags per server call in a single row, enabling fast access and usage. The dictionary data structure is cross-referenced with tag data of actual server calls indicated in the production tag feed to quantify matching records, correct business critical tags (e.g., page level tags inserted on pages of the experience), and value matches in custom tagging designs. Using these techniques, particular records with data quality issues may be pinpointed and custom tagging element issues may also be pinpointed, enabling root cause analysis/comparison across digital experiences with differing custom tagging.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 5 is a schematic diagram, illustrating a set of derived tag data quality rules, in accordance with aspects of the present disclosure;

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, the present disclosure is related to automated data quality scanning of analytics tool tagging, independent of human intervention. Specifically, a data dictionary is formed in a particular structure that provides efficient access to data quality rules of custom tagging within a server call (e.g., page) of a digital experience. Specifically, a design file scanner script is used to convert tag design documentation into data quality rules that are stored in a data rule repository. A dictionary data structure stores expected values of custom tags per server call in a single row, enabling fast access and usage. The dictionary is cross-referenced with tag data of actual server calls indicated in the production tag feed to quantify matching records, correct business critical tags, and value matches in custom tagging designs. The quantification is provided via a dashboard and/or other remediation output, enabling root cause analysis/comparison across digital experiences with differing custom tagging when data quality issues in the tagging arise.

Figure 1:
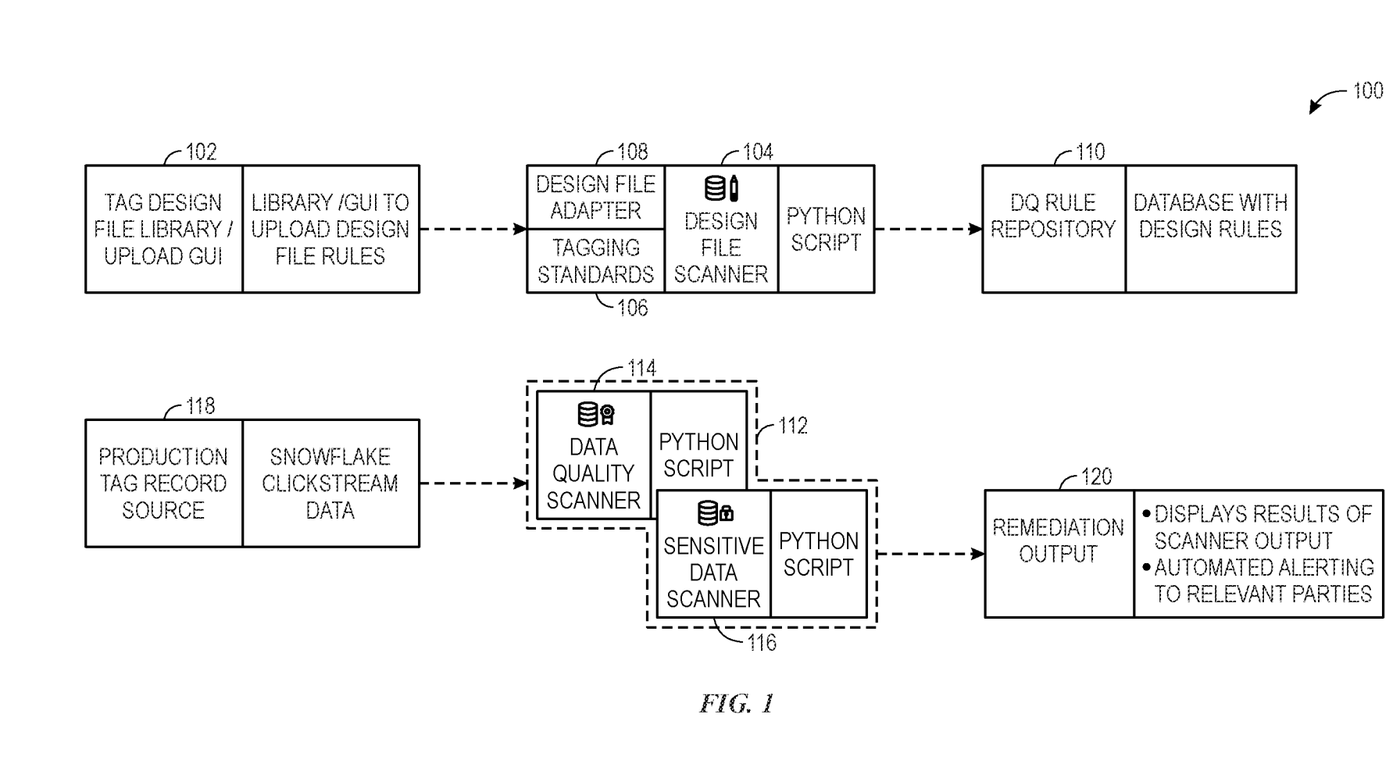
FIG. 1 is a schematic diagram of a system that provides tagging data quality scanning, in accordance with aspects of the present disclosure.

Starting first with an overall discussion of a system for implementing data quality scanning of tagging, FIG. 1 is a schematic diagram of a system 100 that provides tagging data quality scanning, in accordance with aspects of the present disclosure. The system 100 includes a tag design file library and/or graphical user interface (GUI) 102 that allows tag implementation design files that describe tagging implementation details for particular digital experiences to be provided for generation of tag data quality rules.

Figure 2:
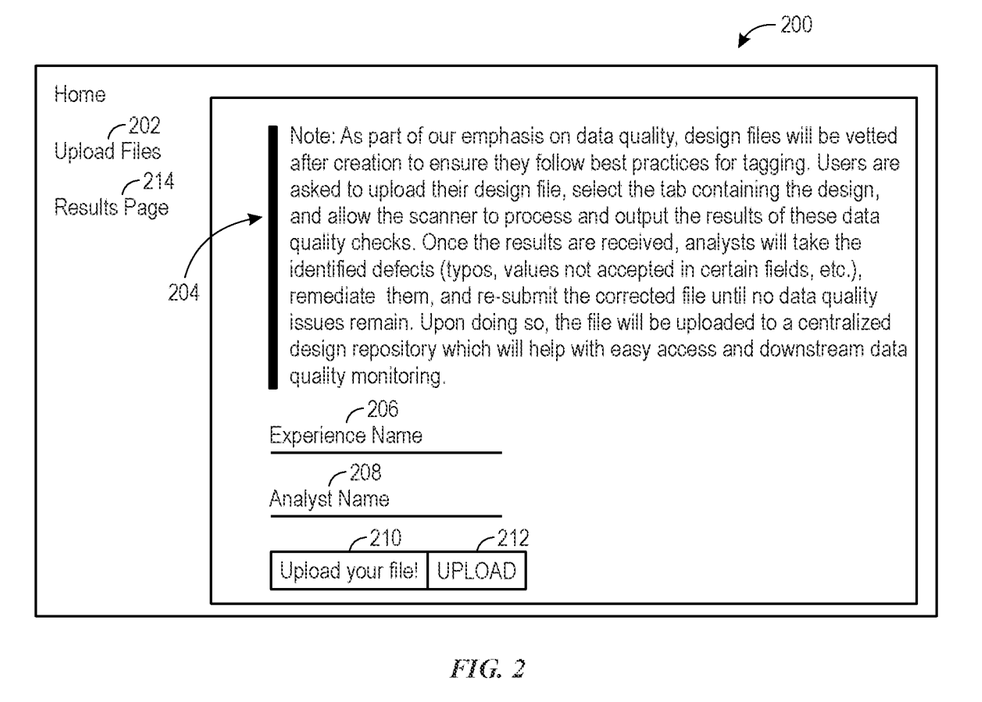
FIG. 2 is a schematic diagram, illustrating a graphical user interface (GUI) that may be used to generate tag data quality rules, in accordance with aspects of the present disclosure.

The tag design files may be uploaded to the rules repository 110 by uploading tag design files via the tag design file library and/or graphical user interface (GUI) 102, such as GUI 200 illustrated in FIG. 2. The GUI 200 includes a selectable affordance 202, that when selected, facilitates upload of a tag design file. Specifically, selection of the selectable affordance 202 results in rendering of an upload details portion 204 of the GUI 200 that may be used to upload a tag design file for generation of tag data quality rules. An Experience Name field 206 enables the uploader to associate a digital experience name with the tag design file and an Analyst Name field 208 enables specification of the uploader's name to associate with the tag design file. In some embodiments, the uploader's identity may be discerned via a login credential or other electronic information accessed from the uploader's computer system. In some embodiments, the uploader may manually input the uploader's identity in the Analyst Name field 208. File field 210 enables the uploader to specify a path where the tag design file is located, enabling the proper tag design file to be found for submission. The upload affordance 212, when selected, retrieves the tag design file specified at the File field 210 and generates data quality rules based upon the tag design file. The Experience Name from the Experience Name field 206 and the uploader name from the Analyst Name field 208 may be associated with the generated rules. The Results Page affordance 214, when selected, may, in some embodiments, provide a graphical illustration of rules generated from the tag design file. In some embodiments, when the Results Page affordance 214 is selected, a data quality indication based upon the generated rules may be provided.

Returning to FIG. 1, the tag design files may be accessed by a design file scanner 104. As illustrated, the design file scanner 104 may include a script (e.g., a Python script) that retrieves the tag design file from the tag design file library 102 and performs an analysis on the tag design file to determine whether the tag design specified in the tag design file adheres to tagging standards (e.g., policies) 106 identified by the design file scanner. This will be discussed in more detail with respect to FIGS. 9 and 10.

Tag design files may take on different formats across different organizations and/or digital experiences. Accordingly, a tag design file adapter 108, specific to a particular format of tag design file, may be used to transform the tag design file into a format useable by the design file scanner 104. The tag design file adapter 108 may include computer-readable instructions, specific to the format of a particular tag design file, that cause the pertinent portions of the tag design file to be identified, extracted, and aggregated into a format useable by the design file scanner 104.

The design file adapter 108 may, upon receipt of the tag design file, transform the tag design file into a format expected by the design file scanner 104. In this manner, different design file adapters 108 may be implemented for differently formatted tag design files. For example, the design file adapter 108 may format the tag design file for use by the design file scanner 104 by removing white space found in the tag design file, remove superfluous data from the tag design file that is not needed for generation of data quality rules, etc. For example, superfluous data may include items useful to describe the tag design in the tag design file that may not be useful for creating the data quality rules. Such superfluous data may include screenshot images of relevant pages, developer notes, etc.

The design file scanner may then generate data quality rules and provide them for storage in the data quality rule repository 110. The process of generating the data quality rules is described in more detail with respect to FIG. 3. By applying data quality monitoring to tag design files via automated scripting rather than by subjective human monitoring, the data quality rules may be more-efficiently monitored for quality. Further, by deriving data quality rules from these data quality monitored tag design files, efficient techniques for monitoring all expected custom tagging may be implemented, resulting in increased awareness of particular tagging problems as they arise. Indeed, countless man hours and re-work activities may be eliminated by using the techniques described herein, while also increasing the quality of the tagging design files and the overall quality of the custom tagging within the system.

The data quality tools 112 may cross-reference the generated data quality rules from the data quality rules repository 110 with production tag data received from a production tag record source 118. For example, the production tag data may be received in the form of Snowflake Clickstream Data. The data quality scanner 114 may identify whether all expected data and whether any unexpected data is found in the production tag data, as determined based upon the data quality rules accessed from the data quality rules repository 110. The data quality scanner 114 dynamically searches which custom tagging is intended to be fired and matches that column name with the True/False outcome of that check. This allows for samples to be generated simultaneously with the original scan and for the True/False outcomes of tagging variables (e.g., traffic variables (props) and conversion variables (eVars)) of other server calls to be compared for root cause analysis. Traffic variables are variables associated with traffic-related events such as page visits, visitor information, page views, sections, sub-section, internal search terms, user type, etc. Conversion variables, on the other hand, are variables associated with events that occur on the page/server call of the digital experience.

The Sensitive Data Scanner 116 may scan the production tag data for data patterns indicative of private information. For example, a scan for data containing social security numbers may look for data in the form of three numbers, a dash, two numbers, a dash, and four numbers.

By using a feed from the production tag record source 118 to perform data quality checking, common accessibility problems with traditional data quality techniques may be avoided. For example, many digital experiences are stored behind a logon layer. Synthetic crawler programs, such as ObservePoint, are oftentimes not able to bypass the logon layer and access digital flows. These persistent issues accessing real-time data streams create a dependency on the collected post-hoc records, causing real-time monitoring solutions via synthetic crawlers to be infeasible. However, with the current techniques where a collected data set corresponding to server calls provided from a daily feed is used, no such authentication dependency exists. Accordingly, there is no need to feed the model login credentials, creating a more effective solution.

Further, the current techniques may provide a more scalable solution than synthetic crawler solutions, which may be overwhelmed by voluminous data. In particular, using the current techniques, because the data is received in a periodic batches, the scanning may run independent of any timing constrains. This lack of time limitations allows for the scanning (e.g., script) to be run at a time in which the least resources are being used to save both money and time. Integration with cloud solutions can allow for the computing power to be dynamically introduced as needed, removing the vulnerability of not having substantial resources to run large scans.

Solutions with less execution capacity can theoretically execute daily runs but doing so requires strenuous effort and potentially days to execute successfully. For some of the sensitive data solutions, generating samples of records which generated flags takes more days on top of that, by which point the scan output has become obsolete and veritably useless. In contrast, the current techniques, in addition to the scalability measures described above, provide scanning for issues and flagging samples, removing the need to run secondary and time-consuming scans. Additional efficiency measures may be provided in the scanning as well. For example, the scanning script may filter from scanning rows without custom tagging, only looking at the designed columns rather than the entire columnar breadth, etc. This may shorten time to insight and make a daily scanning cadence possible.

Results of the data quality scanner 114 and/or the sensitive data scanner 116 may be provided to a remediation output 120. The remediation output may provide a dashboard GUI or other report that displays the results of the scanning and/or provides automated alerts to relevant parties regarding the scanning results.

Figure 3:
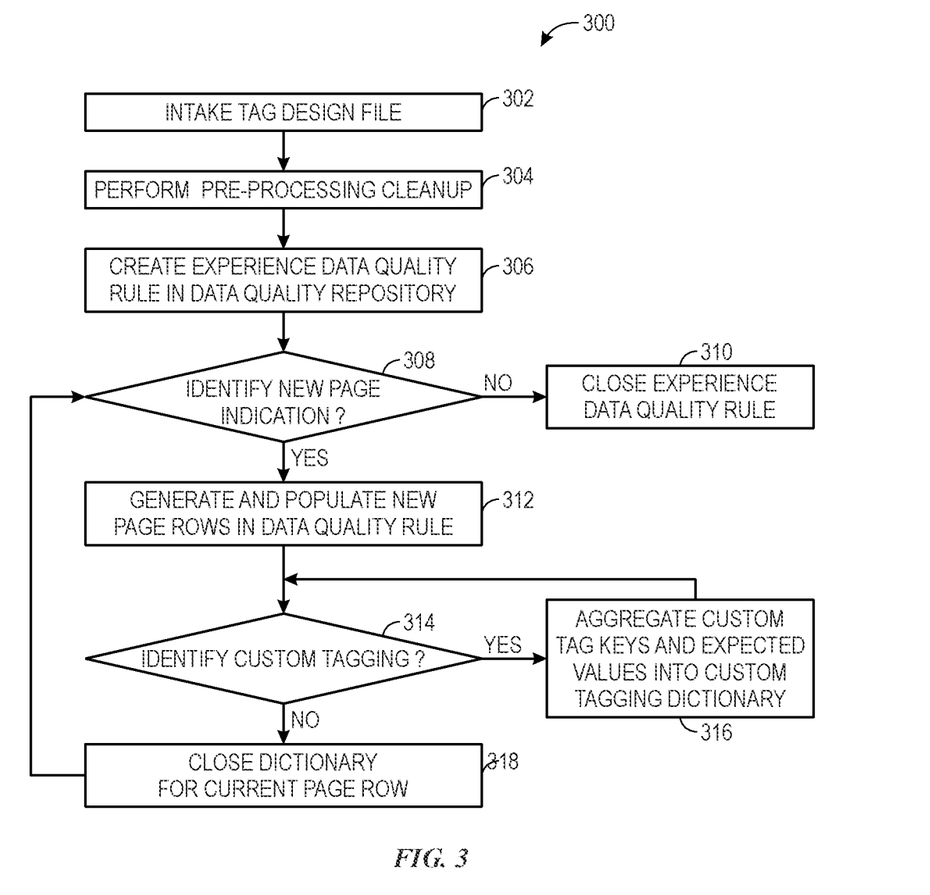
FIG. 3 is a flowchart, illustrating a process for deriving tag data quality rules from a tag design file, in accordance with aspects of the present disclosure.
Figure 4:
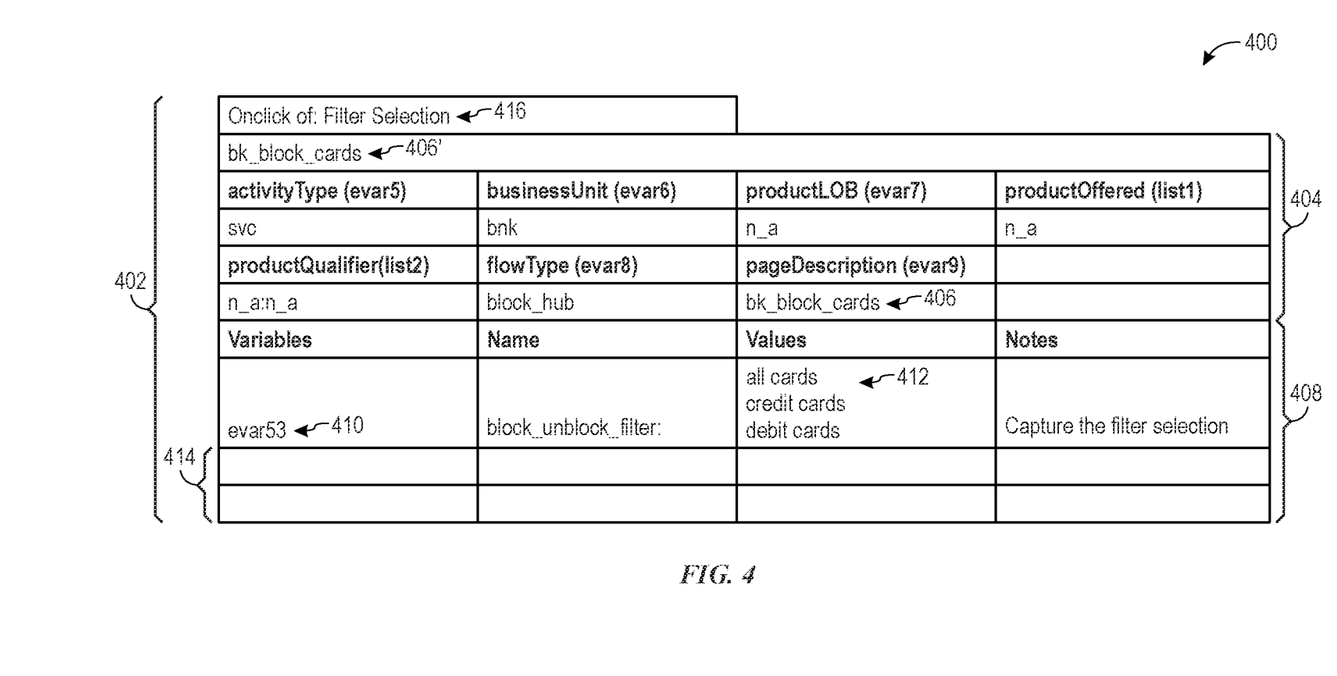
FIG. 4 is a schematic diagram, illustrating a portion of a tag design file that provides tagging design documentation for a particular page/server call, in accordance with the embodiments described herein.
Figure 6:
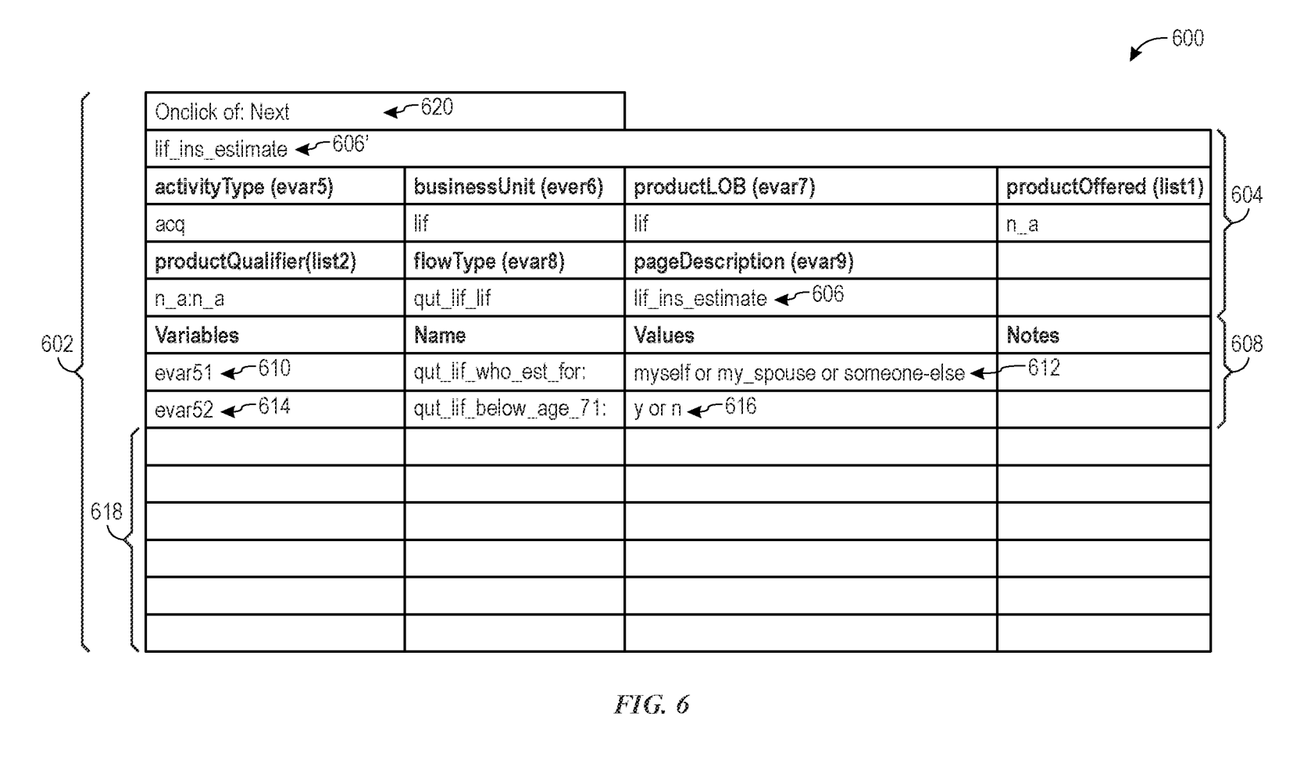
FIG. 6 is a schematic diagram, illustrating another portion of a tag design file that provides tagging design documentation for a particular page/server call, in accordance with the embodiments described herein.
Figure 7:
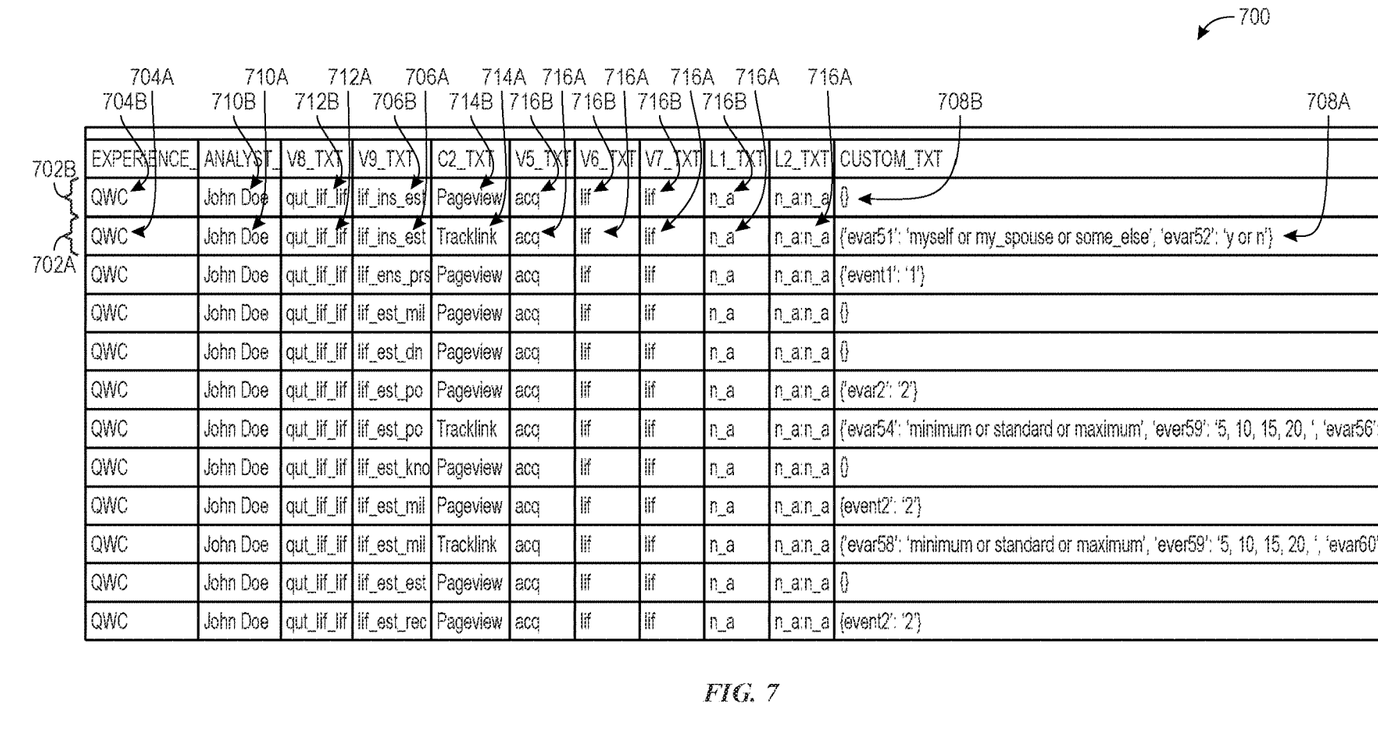
FIG. 7 is a schematic diagram, illustrating another set of derived tag data quality rules, in accordance with aspects of the present disclosure.

Turning now to a discussion of how the data quality rules are generated, FIG. 3 is a flowchart, illustrating a process 300 for deriving tag data quality rules from a tag design file, in accordance with aspects of the present disclosure. FIG. 4 is a schematic diagram, illustrating an example of a portion of a tag design file that provides tagging design documentation for a particular page/server call, in accordance with the embodiments described herein. FIG. 5 is a schematic diagram, illustrating an example of a set of tag data quality rules, in accordance with aspects of the present disclosure. FIG. 6 is a schematic diagram, illustrating another example of another portion of a tag design file that provides tagging design documentation for a particular page/server call, in accordance with the embodiments described herein. FIG. 7 is a schematic diagram, illustrating another example of another set of tag data quality rules, in accordance with aspects of the present disclosure. For simplicity, these figures will be discussed together.

The process 300 begins with intaking a tag design file (block 302). This may be done via the GUI 200 of FIG. 2, as discussed above. For example, an analyst/user may supply a file path to a tag design file in the GUI 200, such the tag design file 400 of FIG. 4 and/or the tag design file 600 of FIG. 6. Custom and non-custom variables may be identified within the tag design file as part of the intake process. As illustrated, the tag design file 400 of FIG. 4 includes a server call/page section 402 for each server call/page of the digital experience represented by the tag design file. The section 402 provides an indication of the variables associated with the server call. Here, the tag design document 400 includes, in section 402, a non-custom variable section 404 that provides variables associated with the initial page view of the server call. For example, the server call/page name/description 406 may be specified (which may populate a value of server call/page 406'), along with other non-custom variables (e.g., business-critical/page-level tag variables expected to adhere to organizational constraints/policies). Additionally, section 402 includes a custom variable section 408 that includes an indication of particular custom variables 410 (e.g., evar 53) and available values 412 (all cards, credit cards, debit cards) for the particular custom variable 410. Other characteristics of the particular custom variable 410, such as a name and/or notes may also be provided.

Similarly, the tag design document 600 of FIG. 6 provides a section 602 for each server call/page of the digital experience represented by tag design file 600. As with section 402 of FIG. 4, section 602 includes a non-custom variable section 604 with a page description field 606 (which may populate a value of server call/page 606') and custom variable section 608 that includes an indication of custom variables associated with the server call/page. Here, for example, custom variable 610 is eVar 51 with available values 612 of myself or my_spouse or someone_else. Custom variable 614 is eVar52 with available values 616 of y or n.

In response to intaking the tag design file, pre-processing cleanup may be performed on the tag design file (block 304). For example, as discussed above, white space removal, superfluous data removal, and other formatting changes may be performed. For example, with respect to tag design file 400 of FIG. 4, white space 414 of server call section 402 may be removed. Further, other superfluous data unnecessary for generation of data quality rules, such as data 416 of tag design file 400 may also be removed. With respect to tag design file 600 of FIG. 6, white space 618 of server call section 402 may be removed. Further, other superfluous data unnecessary for generation of data quality rules, such as data 620 of tag design file 400 may also be removed. For example, superfluous data may include items useful to describe the tag design in the tag design file that may not be useful for creating the data quality rules. Such superfluous data may include screenshot images of relevant pages, developer notes, etc.

Returning to FIG. 3, at step 306, a digital experience data quality rule is generated for each server call/page of the tag design file, specific to the experience represented by the tag design file. As mentioned above, an experience name may be provided with the tag design file and may be associated with the digital experience data quality rule. The digital experience data quality rule may hold expected data values for tags associated with the digital experience. Each row in table of the digital experience data quality rule may provide expected tag values for a particular server call/page of the digital experience associated with the row. FIGS. 5 and 7 each illustrate example data quality rule repositories 500 and 700 storing example experience data quality rules including experience data quality rules for the digital experience represented by FIGS. 4 and 6, respectively.

A determination is made as to whether a new server call/page is indicated within the tag design file (decision block 308). The indication of the new server call/page may take different forms depending on the format of the tag design file. In some embodiments, the new server call/page may be indicated based upon sectioning within the file. In some instances, this indication may take the form of a section header describing a new server call/page and/or a particular field indicating a new server call/page. For example, in the tag design files 400 of FIG. 4 and 600 of FIG. 6, the detection of sections 402 and/or 602 and/or headers 406' and/or 606' may provide an indication of a new server call/page. In other formats, different indications of new server calls/pages within a digital experience may be present.

If no new server call/page is indicated, the Experience Data Quality Rule is closed out as complete (block 310). The set of data quality rules for the digital experience is complete.

If, however, a new sever call/page is indicated in the tag design document, a new Experience Data Quality Rule is generated with new rows for each server call/page, one for the tracklink data (provided in sections 404 and 604) and one for the pageview data (provided in sections 408 and 608) (block 312). The new rows may be populated with variable data from the tag design document.

Next, a determination is made as to whether custom tagging is present (decision block 314). For example, custom tagging may be present when the custom variables section 408 and/or 608 include variables and corresponding values.

When custom tagging is identified, a new custom tagging dictionary entry is created in this row. For example, the custom tagging dictionary entry may provide a delimited list (e.g., comma-delimited) of all custom variables and available values for the particular server call/page. Key value pairs of custom variables are identified and aggregated and inserted into the custom tagging dictionary of the row (block 316). Otherwise, when no custom tagging is identified, the custom dictionary may not be inserted or may be inserted with a null value and the current page row is closed/completed (block 318). The process 300 may continue for new server calls/pages as they are identified, by returning to decision block 308.

Turning to an example, the data quality rule repository 500 of FIG. 5 illustrates a tracklink row 502A and a pageview row 502B that have been populated with data from the tag design document 400 and information supplied in the GUI 200. For example, the EXPERIENCE_NM fields 504A and 504B, which provide an indication of a digital experience name associated with the data quality rule, have been populated with "Block Unblock", which may have been supplied via the GUI 200. Further, the ANALYST_NM fields 510A and 510B have been populated with "John Doe", which may also be supplied by the GUI 200. The remaining fields may be populated based upon data provided in the tag design file 400. For example, V8_TXT fields 512A and 512B correspond to evar8, with the "block_hub" value. V9_TXT fields 506A and 506B correspond to evar9, with the "bk_block_cards" value. C2_TXT field 514A indicates that row 502A is a tracklink rule and C2_TXT field 514B indicates that row 502B is a pageview rule. Additional variable fields 516A and 516B may also be populated from the tag design document. CUSTOM_TXT field 508A provides the tracklink custom data dictionary providing the key value pairs of variables within the tracklink data quality rule. As illustrated, the tracklink data dictionary includes a key (e.g., the custom variable 410 (e.g., "evar53") associated with the available values 412 (e.g., "all cards", "credit cards", and "debit cards". A "/n" separates each of these values, as a carriage return (e.g., represented by "/n" in the data dictionary) separates each of these values in the tag design document. Each key is separated from its associated values with a special character (e.g., here, ":"). Further, when multiple key value pairs exist, each key value pair is delimited (e.g., with a comma). CUSTOM_TXT field 508B provides the pageview custom data dictionary providing key value pairs for all custom variables of the server call/page found in the pageview data quality rules within the tag design document.

As illustrated, the repository 500 may include data quality rules for a number of different experiences. For example, rows 25-29 provide data quality rules for different server calls/pages of a Cash Advance experience, while rows 22-24 provide data quality rules associated with different server calls (e.g., trapdoor, conformation_modal_re . . . , and confirmation_modal_se . . . ) of a Checking Account experience.

Turning to another example, repository 700 includes data quality rules generated from the tag design document 600 of FIG. 6. Tracklink row 702A and Pageview row 702B are generated in a similar manner to the tracklink row 502A and pageview row 502B discussed above. The experience name and analyst name are populated from GUI 200. The experience name is provided in the EXPERIENCE_NM fields 704A and 704B and the analyst name is provided in the ANALYST_NM fields 710A and 710B. V8_TXT fields 712A and 712B correspond to evar8, with the "qut_lif_lif" value. V9_TXT fields 706A and 706B correspond to evar9, with the "lif_ins_est" value. C2_TXT field 714A indicates that row 702A is a tracklink rule and C2_TXT field 714B indicates that row 702B is a pageview rule. Additional variable fields 716A and 716B may also be populated from the tag design document. CUSTOM_TXT field 708A provides the tracklink custom data dictionary providing the key value pairs of variables within the tracklink data quality rule. As illustrated in field 708A, the two custom variables 610 and 614 and their corresponding respective available values 612 and 616 are aggregated as key value pairs and inserted in a delimited fashion into the data dictionary. Accordingly, all custom variables indicated in the custom variable section 608 of the tag design document are inserted into the data dictionary. Further, as indicated in field 708B, no custom tagging is found in the pageview data quality rule.

Figure 8:
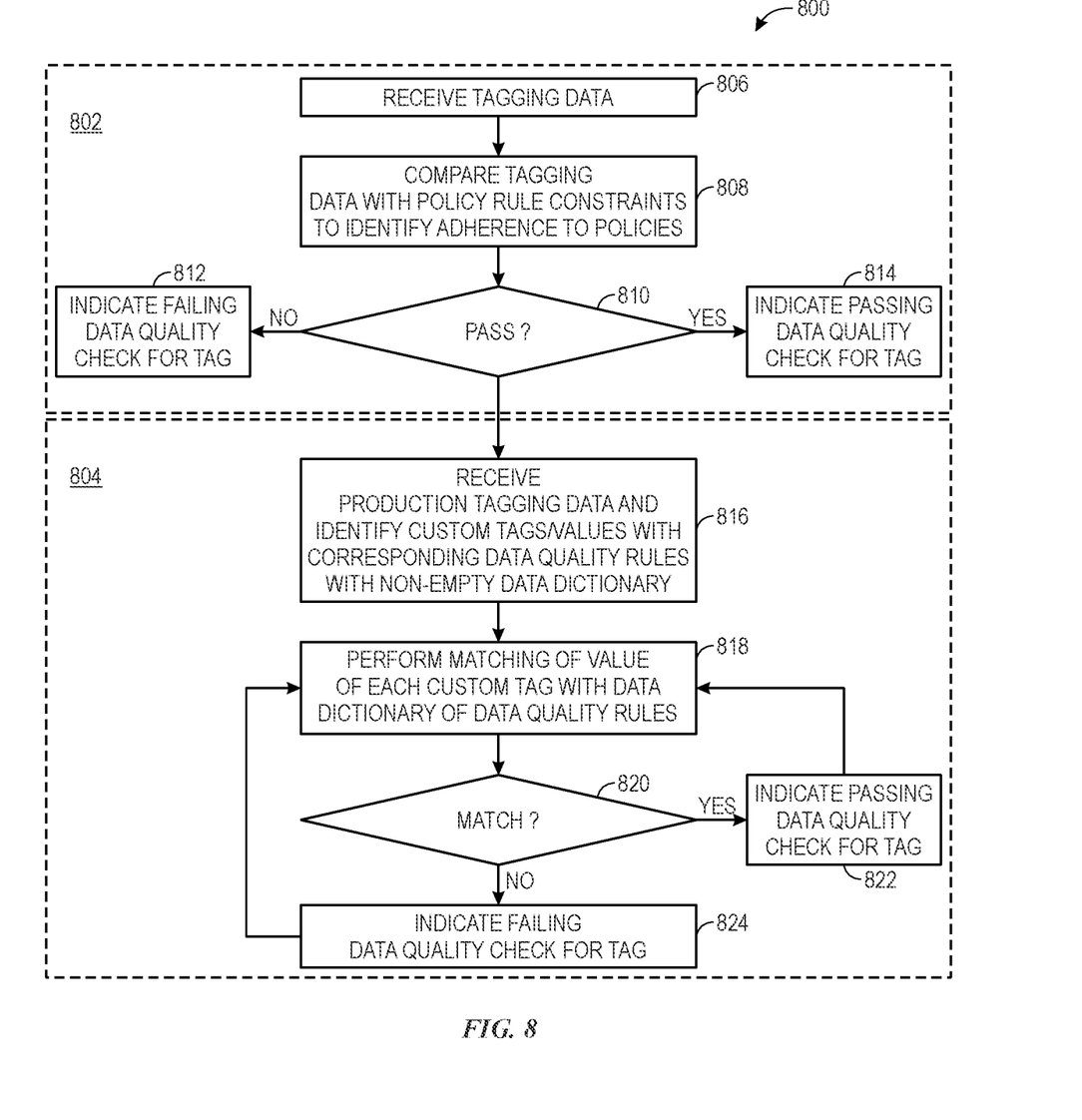
FIG. 8 is a flowchart, illustrating a process for scanning tags for data quality metrics, in accordance with aspects of the present disclosure described herein.

Once the data quality rules are generated, the data quality rules may be used to perform data quality checks on production tagging data. FIG. 8 is a flowchart, illustrating a process 800 for scanning tags for data quality metrics, in accordance with aspects of the present disclosure described herein. The process 800 includes two verification processes, a policy adherence validation process 802 and a custom tagging validation process 804. While processes 802 and 804 are illustrated as being sequentially performed together, either process 802 and/or 804 may be performed independent of the other and does not require performance of the other. Indeed, in some embodiments, process 802 and 804 may be performed by different entities. For example, process 802 may be performed as a pre-processing step by the design file scanner 104, while the data quality scanner 114 may perform process 804 at a later time.

Starting first with the policy adherence validation process 802, tagging data is received (block 806). The tagging data, in some embodiments, may include the tag values indicated in a tag design document (e.g., when a tag design is being tested for adherence to policies) and/or production tagging data values (e.g., when actual production tags are being tested for adherence to policies).

Figure 9:
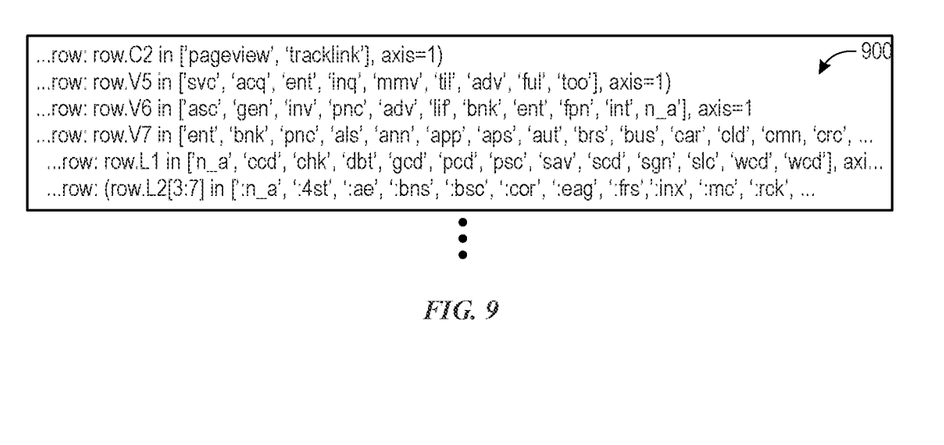
FIG. 9 is a schematic diagram, illustrating scanner checking code to identify tagging design compliance, in accordance with aspects of the present disclosure.

The tagging data is compared with policy rule constraints to identify adherence to policies (block 808). For example, FIG. 9 is a schematic diagram, illustrating policy adherence validation code 900 to identify tagging design compliance, in accordance with aspects of the present disclosure. The first line of code 900 verifies whether, for the particular tagging data, the C2 value is within the policy-allowed values of "Pageview" or "Tracklink". The second line of code 900 verifies whether, for the particular tagging data, the V5 value is within the policy-allowed values of "svc", "acq", "ent", "inq", "mmv", "til", "adv", "ful", and "too". The third line of code 900 verifies whether, for the particular tagging data, the V6 value is within the policy-allowed values of "asc", "gen", "inv", "pnc", "adv", "lif", "bnk", "ent", "fpn", "int", and "n_a".

The fourth line of code 900 verifies whether, for the particular tagging data, the V7 value is within the policy-allowed values of "ent", "bnk", "pnc", "als", "ann", "app", "aps", "aut", "brs", "bus", "car", "cld", "cmn", "crc", . . . . The fifth line of code 900 verifies whether, for the particular tagging data, the L1 value is within the policy-allowed values of "n_a", "ccd", "chk", "dbt", "gcd", "pcd", "psc", "sav", "scd", "sgn", "slc", "wcd", and "wce". The sixth line of code 900 verifies whether, for the particular tagging data, the fourth through eighth characters are within the policy-allowed values of ": n_a", ": 4st", ": ae", ": bns", ": bsn", ": cor", ": eag", ": frs", ": inx", ":mc", "rck" . . . .

Returning to FIG. 8, a determination is made as to whether the validation passes for the tagging data (e.g., whether the tagging data adheres to the policy) (decision block 810). For example, running the validation code 900 returns either a true or false indicating whether the values are within the policy-allowed values.

Figure 10:
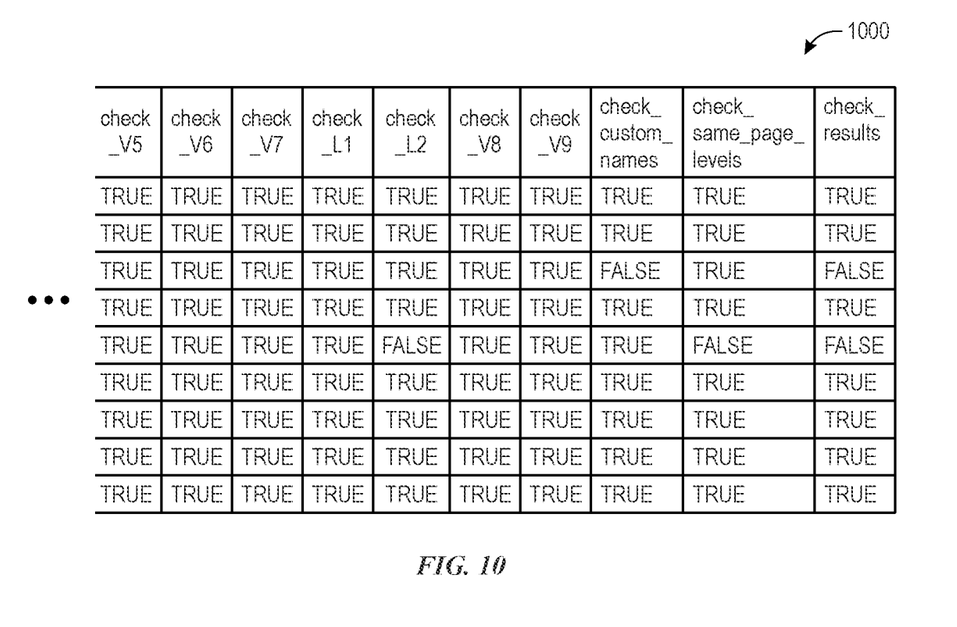
FIG. 10 is a schematic diagram, illustrating tagging design compliance scanning results, in accordance with aspects of the present disclosure.

When the validation does not pass, an indication of failure of the data quality check for the tagging data is provided (block 812). When the validation passes, an indication of passing the data quality check for the tagging data is provided (block 814). For example, FIG. 10 is a schematic diagram, illustrating tagging design compliance scanning results 1000, in accordance with aspects of the present disclosure. Each row provides policy adherence validation results for a particular server call/page. The last column, the check_result column provides a Boolean value indicating whether any of the validation checks failed. If none failed, then true is returned. Otherwise, false is returned. While several policy adherence validation checks have been discussed any number of checks may be implemented depending on the particular policy constraints.

Returning to FIG. 8, the custom tagging validation process 804 begins by receiving production tagging data and identifying custom tags/values with corresponding data quality rules (e.g., matching experience and server call combinations between the production tagging data and the data quality rules), where the data quality rules have a non-empty data dictionary (block 816). The data quality scanner 114 optimizes performance and value for custom tag validation by filtering out validation checks on tags that are not expected to return data values. The data quality scanner 114 does this by using the data quality rule repository 110 as the system of record, to identify the custom tagging columns that have been specified in that server call's design. Only these identified custom tagging columns are scanned for validation matches. This allows for empty server calls (e.g., pageviews or tracklinks with only page-level tags) to be skipped from custom tagging validation monitoring, greatly reducing processing requirements and time to achieve validation results. This is extremely beneficial as digital experiences scale upward. For example, with tens of millions of daily server calls, such performance optimizations lead to much faster scans and more efficient usage of resources.

For the scanned custom tags, a matching of values of the production tagging data to the available values in the data dictionary is performed (block 818) to determine whether the production tagging data matches at least one of the available values provided in the data quality rules (decision block 820). If the custom tagging values do match one of the specified available values in the data quality rules, an indication of a passing data quality check for the particular mismatched tag is provided (block 822). If the custom tagging values do not match one of the specified available values in the data quality rules, an indication of a failing data quality check for the particular mismatched tag is provided (block 824).

Figure 11:
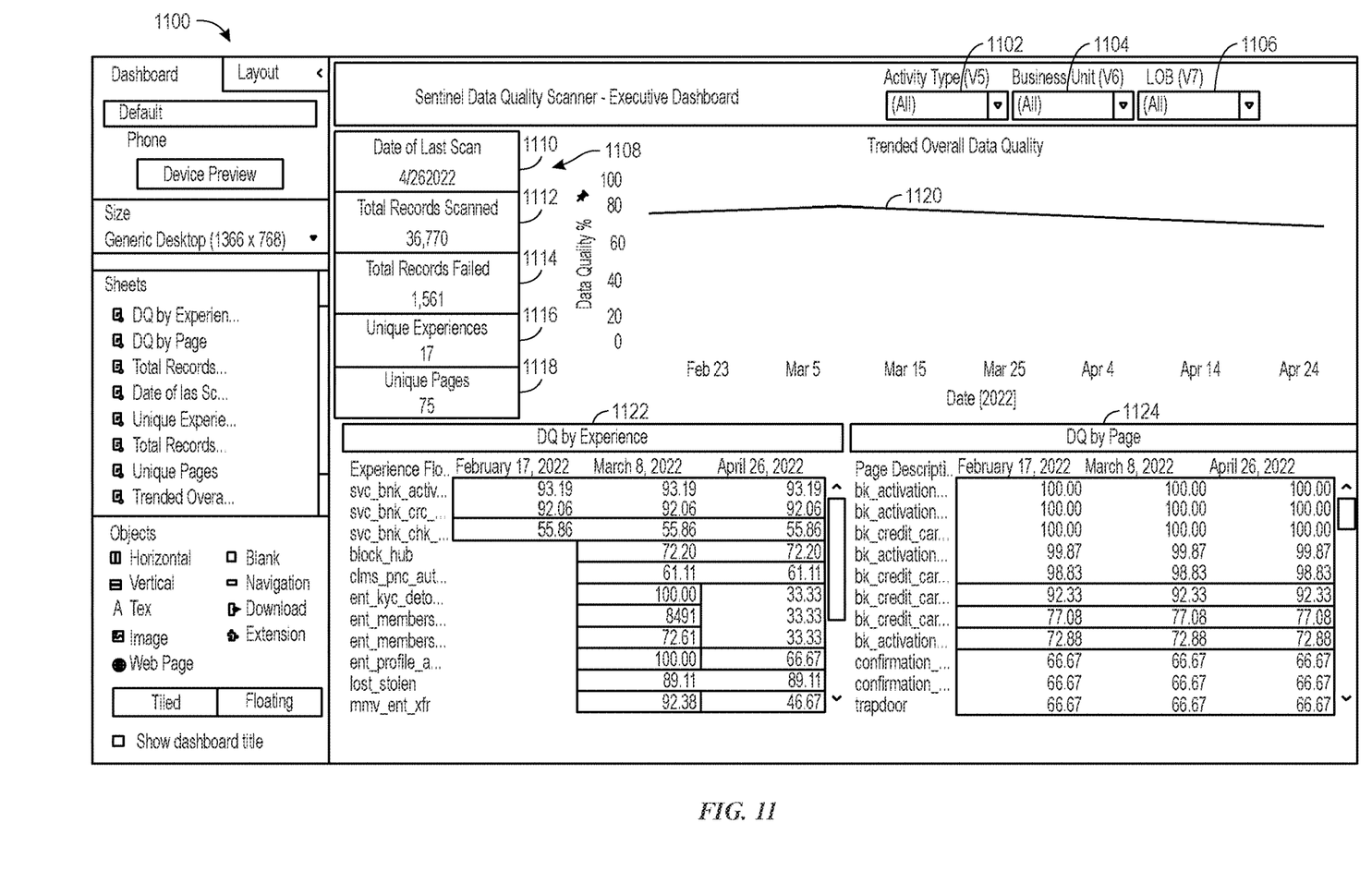
FIGS. 11 and 12 are schematic diagrams, illustrating tag data quality scan results, summarized in a dashboard graphical user interface (GUI).
Figure 12:
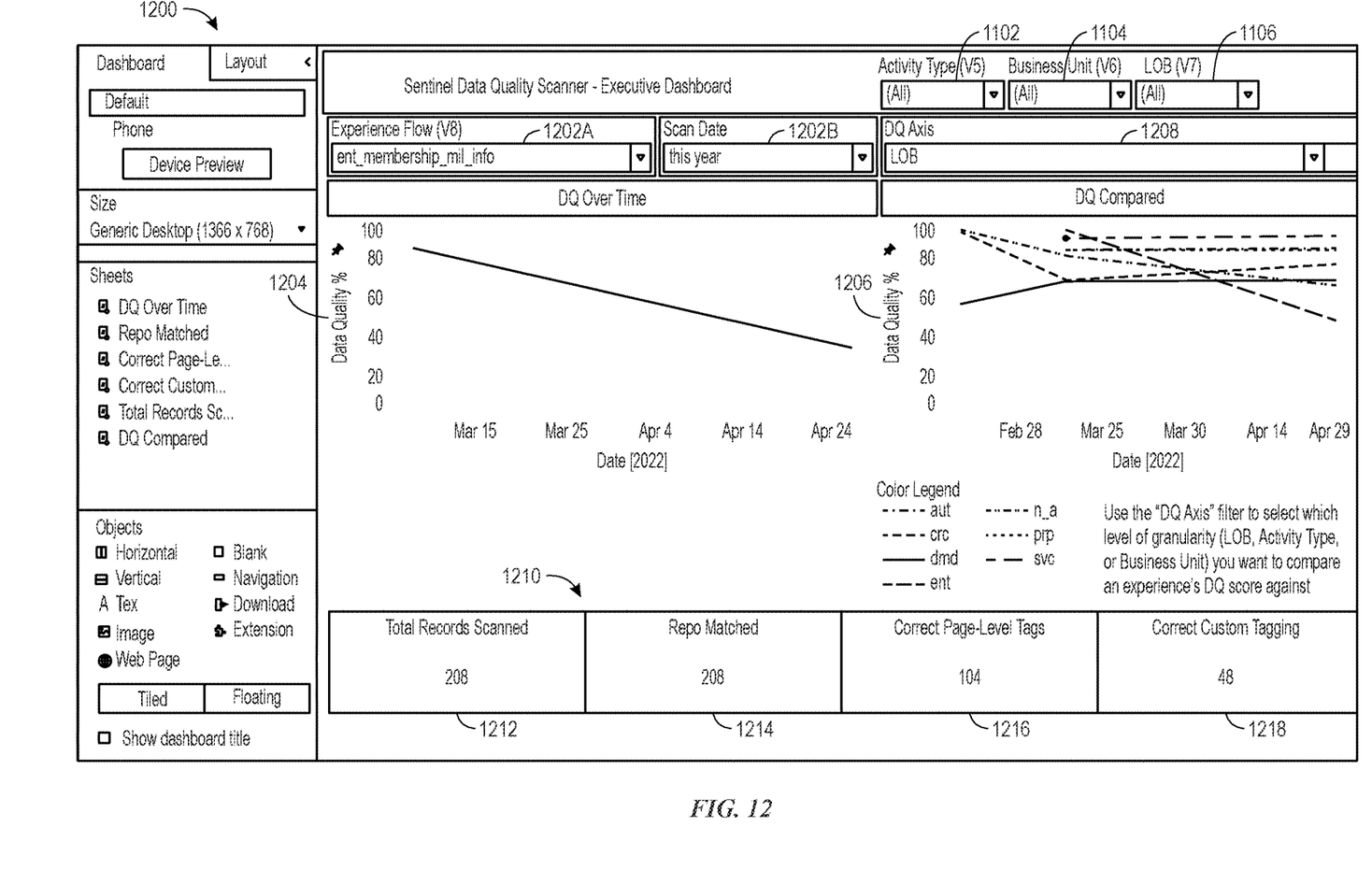

The validation results may be accumulated and used to provide valuable data quality metrics regarding tagging data quality over time. FIGS. 11 and 12 are schematic diagrams, illustrating tag data quality scan results, summarized in a dashboard graphical user interface (GUI).

FIG. 11 illustrates an executive dashboard view 1100 of the GUI where data quality metrics are provided across different activity types, which may be filtered using selectable affordance 1102, business units, which may be filtered using selectable affordance 1104, and lines of business, which may be filtered using selectable affordance 1106. Here, because each of the affordances 1102, 1104, and 1106 are set to "(All)", no filtering of data quality results across activity type, business unit, or line of business is provided. If however, such filtering were selected, the data quality results may be filtered by matching V5 values in data quality results with a selected value of affordance 1102, matching V6 values in data quality results with a selected value of affordance 1104, and/or matching V7 values in data quality results with a selected value of affordance 1106.

The dashboard 1100 provides overall data quality result metrics 1108, such as a data of last scan 1110, a total number of records scanned 1112, a total number of records that have failed validation 1114, a total number of unique experiences that are being tested 1116 (e.g., as indicated by a unique count of experience names in the data quality rules stored in the data quality rule repository), a unique number of pages being tested within the experiences 1118 (e.g., as indicated by a unique count of experience names and page name combinations in the data quality rules stored in the data quality rule repository), a trend in overall data quality over time periods 1120, etc. Additionally, data quality results metrics may be provided over time at the experience level, as illustrated by widget 1122 and/or at the page level, as illustrated by widget 1124.

FIG. 12 illustrates an experience view 1200 of the GUI, where data quality results metrics are provided at the experience level. For example, data quality results metrics associated with a particular experience selected via affordance 1202 (e.g., here, "ent_membership_mil_info") may be provided over a time period specified by selection of a value from affordance 1202B in view 1200. Widget 1204 provides a graphical indication of data quality over time, while widget 1206 provides a data quality comparison with particular lines of business, activity types, and/or business units based upon a selection within affordance 1208. For example, here a line of business value is selected from affordance 1208, resulting in a comparison between data quality of the experience selected via affordance 1202A and the data quality metrics of the particular lines of business (e.g., "aut", "crc", "dmd", "ent", "n_a", "prp", and "svc".

Overall metrics 1210 specific to the selected experience and time (e.g., selected via affordances 1202A and 1202B, respectively) may also be provided. For example, a total number of records scanned 1212, a total number of repository matched values 1214, a number of correct page-level tags 1216, and/or a number of correct custom tagging results found 1218 may be provided.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An analytics tagging validation system, comprising:
one or more computer processors and a tangible, non-transitory, computer-readable medium that stores computer programs comprising:
 a design file scanner configured to:
  generate data quality rules indicating expected values of a custom analytics tag associated with a particular server call of a digital experience, derived from a tag design file of the digital experience, by:
   intaking the tag design file;
   identifying one or more server calls defined within the tag design file;
   identifying variables associated with the one or more server calls defined in the tag design file, wherein the variables comprise custom tagging variables;
   generating, in a database, a new row with an indication of the one or more server calls and their associated variables;
   identifying available values associated with the custom tagging variables; and
   inserting into a field within the new row, a data dictionary, the data dictionary comprising a delimited list of key value pairs, the key value pairs each comprising an indication of a custom tagging variable of the custom tagging variables associated with the particular server call and corresponding available values of the available values associated with the custom tagging variables, wherein the corresponding available values comprise a plurality of alpha numeric values;
 a data quality rule repository configured to store the generated data quality rules; and
 a data quality scanner, configured to:
  perform a data quality validation to identify whether production custom tagging data adheres to the generated data quality rules; and
  provide an indication of results of the data quality validation to a remediation output.

2. The analytics tagging validation system of claim 1, wherein the data quality scanner is configured to limit the data quality validation to a subset of the production custom tagging data associated with data quality rules stored in the data quality rule repository that include a non-empty data dictionary.

3. The analytics tagging validation system of claim 1, wherein the design file scanner is configured to:
identify one or more policy constraints for at least one subset of variables defined in the tag design file;
determine whether the at least one subset of variables adheres to the one or more policy constraints; and
provide an indication as to whether the at least one subset of variables adheres to the one or more policy constraints via the remediation output.

4. The analytics tagging validation system of claim 1, wherein the remediation output comprises a data quality results dashboard providing data quality results metrics observed by the data quality scanner.

5. The analytics tagging validation system of claim 4, wherein the data quality results dashboard comprises an executive view configured to provide experience-level data quality results metrics, page-level data quality results metrics, and overall data quality results metrics observed by the data quality scanner.

6. The analytics tagging validation system of claim 4, wherein the data quality results dashboard comprises an experience view configured to exclusively provide experience-level data quality results metrics of a particular experience, observed over a specific time by the data quality scanner, wherein the particular experience and specific time are selected via affordances provided in the experience view.

7. The analytics tagging validation system of claim 6, wherein experience-level data quality results metrics comprise a comparison of a selected experience's data quality against data quality metrics associated with particular lines of business, particular activity types, or particular business types based upon an affordance selection.

8. The analytics tagging validation system of claim 1, wherein the design file scanner is configured to:
use a design file adapter of a plurality of design file adapters to transform the tag design file into a format usable by the design file scanner, wherein the design file adapter provides an indication of an expected format of the tag design file useful to extract information for the generation of the data quality rules.

9. A tangible, non-transitory, computer-readable medium, comprising computer-readable instructions that, when executed by one or more processors, cause the one or more processors to:
generate data quality rules indicating expected values of a custom analytics tag associated with a particular server call of a digital experience, derived from a tag design file of the digital experience, by:
intaking the tag design file;
identifying one or more server calls defined within the tag design file;
identifying variables associated with the one or more server calls defined in the tag design file, wherein the variables comprise custom tagging variables;
generating, in a data quality rule repository, a new database row with an indication of the one or more server calls and their associated variables;
identifying available values associated with the custom tagging variables; and
inserting into a field within the new database row, a data dictionary, the data dictionary comprising a delimited list of key value pairs, the key value pairs each comprising an indication of a custom tagging variable of the custom tagging variables associated with the particular server call and corresponding available values of the available values associated with the custom tagging variables, wherein the corresponding available values comprise a plurality of alpha numeric values;
cause storage of the generated data quality rules in the data quality rule repository;
perform a data quality validation to identify whether production custom tagging data adheres to the data quality rules; and
provide an indication of results of the data quality validation to a remediation output.

10. The tangible, non-transitory computer-readable medium of claim 9, comprising computer-readable instruction that, when executed by the one or more processors, cause the one or more processors to:
limit the data quality validation to a subset of the production custom tagging data associated with data quality rules stored in the data quality rule repository that include a non-empty data dictionary.

11. The tangible, non-transitory computer-readable medium of claim 9, comprising computer-readable instruction that, when executed by the one or more processors, cause the one or more processors to:
identify one or more policy constraints for at least one subset of variables defined in the tag design file;
determine whether the at least one subset of variables adheres to the one or more policy constraints; and
provide an indication as to whether the at least one subset of variables adheres to the one or more policy constraints via the remediation output.

12. The tangible, non-transitory computer-readable medium of claim 9, wherein the remediation output comprises a data quality results dashboard providing observed data quality results metrics, the data quality results dashboard comprising:
an executive view configured to provide experience-level data quality results metrics, page-level data quality results metrics, and overall data quality results metrics; and
an experience view configured to exclusively provide experience-level data quality results metrics of a particular experience, observed over a specific time, wherein the particular experience and specific time are selected via affordances provided in the experience view.

13. The tangible, non-transitory computer-readable medium of claim 12, wherein experience-level data quality results metrics comprise a comparison of a selected experience's data quality against data quality metrics associated with particular lines of business, particular activity types, or particular business types based upon an affordance selection.

14. The tangible, non-transitory computer-readable medium of claim 9, comprising computer-readable instruction that, when executed by the one or more processors, cause the one or more processors to:
transform the tag design file into a format usable to extract information for the generation of the data quality rules, by accessing a design file adapter of a plurality of design file adapters, the design file adapter providing an indication of an expected format of the tag design file.

15. A computer-implemented method, comprising:
generating data quality rules indicating expected values of a custom analytics tag associated with a particular server call of a digital experience, derived from a tag design file of the digital experience, by:

intaking the tag design file;

identifying one or more server calls defined within the tag design file;

identifying variables associated with the one or more server calls defined in the tag design file, wherein the variables comprise custom tagging variables;

generating, in a data quality rule repository, a new database row with an indication of the one or more server calls and their associated variables;

identifying available values associated with the custom tagging variables; and inserting into a field within the new database row, a data dictionary, the data dictionary comprising a delimited list of key value pairs, the key value pairs each comprising an indication of a custom tagging variable of the custom tagging variables associated with the particular server call and corresponding available values of the available values associated with the custom tagging variables, wherein the corresponding available values comprise a plurality of alpha numeric values;

causing storage of the generated data quality rules in the data quality rule repository;

performing a data quality validation to identify whether production custom tagging data adheres to the data quality rules; and providing an indication of results of the data quality validation to a remediation output.

16. The computer-implemented method of claim 15, comprising limiting the data quality validation to a subset of the production custom tagging data associated with data quality rules stored in the data quality rule repository that include a non-empty data dictionary.

* * * * *